United States Patent
Khizar et al.

(10) Patent No.: US 11,619,396 B2
(45) Date of Patent: Apr. 4, 2023

(54) INSULATION FILM

(71) Applicant: WHIRLPOOL CORPORATION, Benton Harbor, MI (US)

(72) Inventors: Muhammad Khizar, Saint Joseph, MI (US); Ermanno Buzzi, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/550,086

(22) Filed: Dec. 14, 2021

(65) Prior Publication Data
US 2022/0107090 A1 Apr. 7, 2022

Related U.S. Application Data

(63) Continuation of application No. 16/242,069, filed on Jan. 8, 2019, now Pat. No. 11,236,912.

(51) Int. Cl.
| | | |
|---|---|---|
| *F24C 15/04* | (2006.01) | |
| *B32B 7/12* | (2006.01) | |
| *B32B 9/04* | (2006.01) | |
| *B82Y 30/00* | (2011.01) | |

(52) U.S. Cl.
CPC ............... *F24C 15/04* (2013.01); *B32B 7/12* (2013.01); *B32B 9/041* (2013.01); *B32B 9/047* (2013.01); *B32B 2262/103* (2013.01); *B32B 2311/08* (2013.01); *B82Y 30/00* (2013.01); *C04B 2235/5224* (2013.01)

(58) Field of Classification Search
CPC .......... B32B 9/041; B32B 9/047; B32B 7/12; B32B 2262/103; B32B 15/02; B32B 15/04; B32B 5/02; B32B 9/00; F24C 15/34

See application file for complete search history.

(56) References Cited

U.S. PATENT DOCUMENTS

| | | | |
|---|---|---|---|
| 7,897,273 B2 * | 3/2011 | Thiel | F24C 15/04 428/432 |
| 9,994,715 B2 | 6/2018 | Yushin et al. | |
| 2019/0363010 A1 * | 11/2019 | Brown | C03C 17/3607 |

FOREIGN PATENT DOCUMENTS

| | | |
|---|---|---|
| CN | 1838904 A | 9/2006 |
| CN | 104194623 A | 12/2014 |
| CN | 102132105 B | 10/2015 |
| CN | 104473558 B | 2/2017 |
| CN | 107048976 A | 8/2017 |
| CN | 207341597 U | 5/2018 |
| CN | 108981980 A | 12/2018 |
| DE | 102015111508 A1 | 1/2017 |
| WO | 12019965 A1 | 2/2012 |

OTHER PUBLICATIONS

Chinese Office Action Issued in Counterpart CN201911394087.4, dated Jul. 14, 2022, 2 Pages.

* cited by examiner

*Primary Examiner* — Michael Zhang
(74) *Attorney, Agent, or Firm* — McGarry Bair PC

(57) ABSTRACT

Aspects of the disclosure generally relate to an insulation film, including a thermal insulation film or an insulation film for a cooking appliance. The insulation film can include a substrate, a first layer comprising silver nanowires proximate to the substrate, and a second layer comprising porous alumina proximate to the first layer and distal from the substrate.

20 Claims, 5 Drawing Sheets

INSULATION FILM

CROSS-REFERENCE TO RELATED APPLICATION

This application is a continuation of U.S. patent application Ser. No. 16/242,069, filed Jan. 8, 2019, now U.S. Pat. No. 11,236,912, issued Feb. 1, 2022, which is incorporated herein by reference in its entirety.

BACKGROUND

Cooking appliances typically include a heated chamber for cooking a food item, and one or more components responsible for the mechanical or electrical operations of the appliance. For example, an oven can include a hinged door with a handle, or a user-interface component such as a knob or a control pad for a user to direct operation of the oven. Components of the oven can include a heat-resistant property to provide for user interaction with such components during heating of the chamber.

BRIEF DESCRIPTION

In one aspect, the disclosure relates to an insulation film for a cooking appliance including a substrate, a first layer comprising silver nanowires proximate to the substrate, and a second layer comprising porous alumina proximate to the first layer and distal from the substrate, with the porous alumina having an average pore size of 10-35 micrometers.

In another aspect, the disclosure relates to a thermal insulation film including a first layer comprising a mesh of silver nanowires with a diameter of 10-20 micrometers and an area density of 0.15-0.25 g/m2, and a second layer abutting the first layer and comprising porous alumina with an average pore size of 10-35 micrometers, wherein an emissivity of the first layer is between 0.02-0.8.

DETAILED DESCRIPTION

Aspects of the disclosure relate to a heat-resistant component in the form of an insulation film containing nanowires. Aspects of the disclosure are described in the context of a household cooking appliance, such as an oven. It will be understood that the disclosure is not so limited and can have general applicability, including to any component in a heated environment.

Some cooking appliances or other heat-generating appliances can include pocket-style handles wherein a user pulls on a recessed portion of a door or access panel adjacent a heated chamber. During operation of the appliance, heat can localize or be trapped within the recessed portion of the pocket handle. This can cause an undesirably high temperature within the recessed portion or on surfaces of the handle that a user might grasp.

Figure 1:
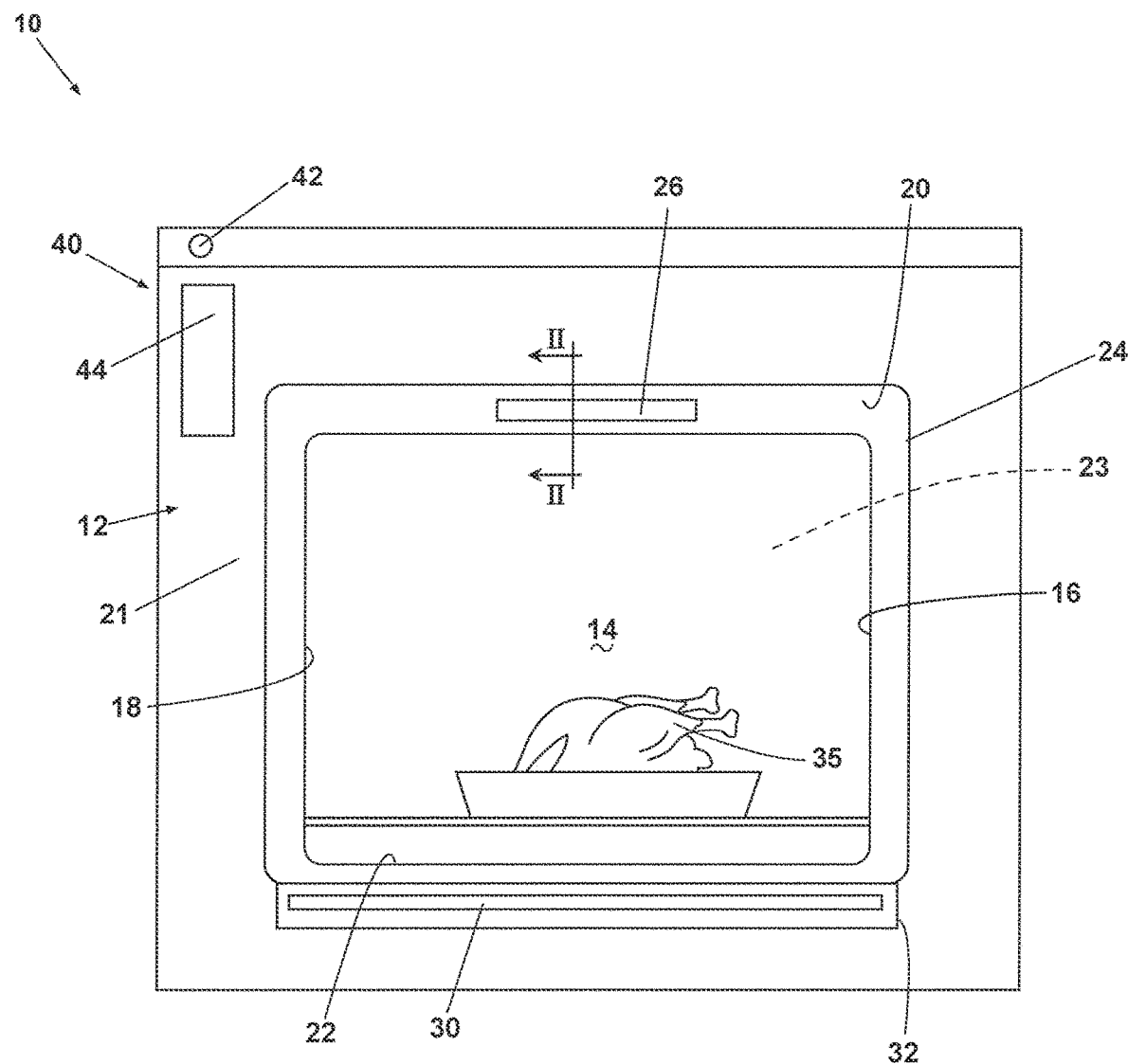
FIG. 1 is a schematic perspective view of an exemplary household cooking appliance according to various aspects described herein.

FIG. 1 illustrates an exemplary household cooking appliance 10 in the form of an oven. It will be understood that while illustrated as an oven, the household appliance can include any home appliance used for cooking or preparing food, including a toaster oven or cooktop in non-limiting examples.

The cooking appliance 10 can include a cabinet 12 with an open-faced cooking chamber 14 defined by a pair of spaced side walls 16, 18 joined by a top wall 20, a bottom wall 21, and a rear wall 23. A door 24 selectively closes the chamber 14. The door 24 in an open position can allow a user to access the chamber 14, while the door 24 in a closed position prevents access to the chamber 14 and seals the chamber 14 from the external environment. A handle 26 can be provided in the door 24 for moving the door 24 between open and closed positions.

The cooking appliance 10 can also include at least one heating element 30, which is illustrated in the example of FIG. 1 as being hidden or mounted beneath the cooking chamber bottom wall 22 in a heating element housing 32. Heat from the heating element 30 can conduct through the bottom wall 22 and into the chamber 14. Alternatively, the heating element 30 can be mounted inside the chamber 14, where heat can conduct or radiate inside the chamber 14, such as along the side walls 16, 18 in non-limiting examples. While not shown, a convection fan can also be provided in the cooking appliance 10 for circulating air or steam within the chamber 14. A food item 35 can be placed within the chamber 14 to be cooked by the cooking appliance 10.

A human-machine interface or user interface 40 can also be provided in the cooking appliance 10. The user interface 40 can include any suitable interface for input or control of the cooking appliance 10, such as an electronic display or touchscreen display, as well as manually-operated components such as buttons, dials, or switches. In the illustrated example, the user interface 40 includes a knob 42 and an electronic panel 44 provided in a front wall 21 of the cabinet 12. The electronic panel 44 can include at least one electronically-controlled switch (not shown). It will be understood that the user interface 40 can include more or fewer components than those shown.

Figure 2:
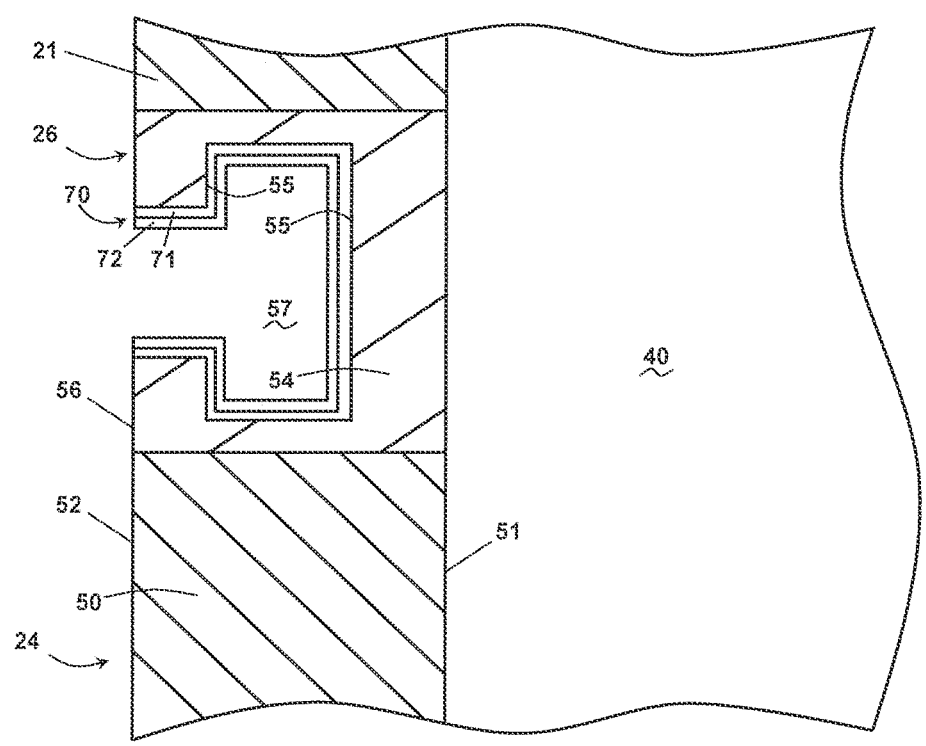
FIG. 2 is a side sectional view of the household cooking appliance of FIG. 1 along line II-II including a component in the form of a handle.

Turning to FIG. 2, a side sectional view of the cooking appliance 10 is illustrated. The door 24 can include a door body 50 with an inner surface 51 thermally confronting the cooking chamber 14 and an outer surface 52 within which the handle 26 can be located. As used herein, a surface "thermally confronting" the cooking chamber 14 will refer to a surface being thermally coupled to the cooking chamber 14 such that heat within the cooking chamber 14 can be transferred to the surface, including by conduction, convection, or radiation.

In the illustrated example, the handle 26 is in the form of a "pocket." More specifically, the handle 26 can include a handle body 54 with an inner contact surface 55 thermally confronting the cooking chamber 14, as well as an outer handle surface 56 that is flush or coplanar with the door outer surface 52. A gap 57 can be defined between the inner contact surface 55 and outer handle surface 56. A user can insert a hand into the gap 57 and pull on the inner contact surface 55 to open the door 24. In an alternate example (not shown), the handle can be in the form of a bar projecting outward from the door 24, wherein a user can grasp the bar and pull to open the door 24.

A composite 70 can be disposed on the inner contact surface 55. The composite 70 can be in the form of an insulation film 76 and include a first layer 71 and a second layer 72. The composite 70 can be utilized to prevent excessive heating of the handle 26 during operation of the cooking appliance 10. Optionally, the composite 70 can also be applied to other surfaces of the door 24, such as the inner surface 51 or the outer surface 52.

Figure 3:
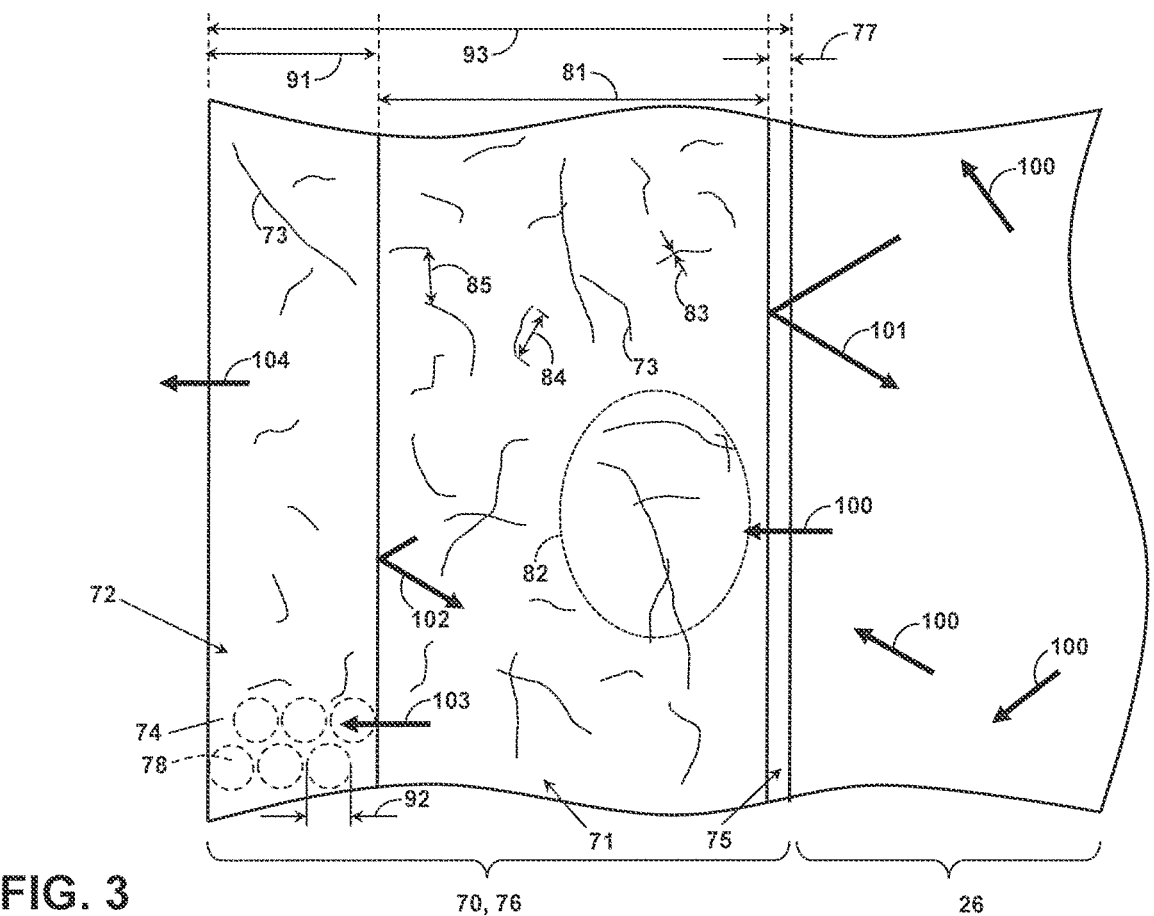
FIG. 3 is a schematic view of an insulation film that can be utilized in the component of FIG. 2 with layers and heat flows illustrated.

Turning to FIG. 3, the composite 70 is illustrated in further detail. The first layer 71 of the composite 70 can include silver nanowires 73 forming a mesh. In one example the mesh can be a structured fiber mesh, such as a woven fiber mesh with at least one ply. In another example the mesh can be a non-structured mesh wherein the fibers have random orientations within the mesh. The second layer 72 of the composite 70 can include porous alumina 74 with air-filled pores 78 defined within the second layer 72. For clarity, some exemplary pores 78 are illustrated and it should be understood that the pores 78 can be arranged throughout the second layer 72, including with an ordered or random orientation within the second layer 72. In the illustrated example, the first layer 71 is proximate the inner contact surface 55 of the handle 26, and lies between the inner contact surface 55 and the second layer 72.

Optionally, a substrate 75 having a substrate thickness 77 can be included in the composite 70. In one example, the substrate 75 can include an adhesive and can be positioned between the inner contact surface 55 and first layer 71. The first layer 71 can be proximate to the substrate 75, and the second layer 72 can be proximate to the first layer 71 and distal from the substrate 75. It is contemplated that the first and second layers 71, 72 and substrate 75 can at least partially define the insulation film 76, and can be applied to the inner contact surface 55 of the handle 26 in one non-limiting example.

The first layer 71 can be formed of a polymeric material with the silver nanowires 73 dispersed within the polymeric material. The first layer 71 can have a first layer thickness 81 and an area density 82. The silver nanowires 73 can have a diameter 83 and a length 84. An average spacing 85 can be defined between adjacent silver nanowires 73. In one non-limiting example, the diameter 83 can be approximately 10-20 nm, including 15-17 nm, the average spacing 85 can be approximately 150-200 nm, the length 84 can be approximately 10-80 µm, the first layer thickness 81 can be approximately 50-100 µm, and the area density can be 0.15-0.25 g/m². As used herein, "approximate" or "approximately" will refer to a value that does not differ from a stated numerical value (e.g. 0.2 g/m²) or from a range of numerical values (e.g. 100-400 nm) by more than a predetermined limit. In one example the predetermined limit can be relative, such within 10% of a stated numerical value or a range of numerical values. In another example the predetermined limit can be an absolute limit, such as 1 micrometer or smaller. In still another example the predetermined limit can be based on another parameter, such as the average spacing 85 not being more than 10 times the diameter 83 of the silver nanowires 73.

The second layer 72 can have a second layer thickness 91, such as between 50-100 µm in a non-limiting example. An average pore size 92 of the porous alumina structure can be defined within the second layer 72, such as approximately 10-35 µm, or 22.9±10.3 µm in non-limiting examples. It is contemplated that the composite 70 can have an overall thickness 93 at least partially defined by the first and second layer thicknesses 81, 91, and substrate thickness 77. In one non-limiting example, the overall thickness 93 can be 200-250 µm. Silver nanowires 73 can also be provided within the second layer 72, including with an exemplary diameter 83 of approximately 10-20 nm, a length 84 of approximately 10-80 µm, and an average spacing 85 of approximately 150-200 nm in one non-limiting example.

Arrows illustrate heat transfer during operation of the cooking appliance 10 (FIG. 1). Heat shown with arrows 100 from within the cooking chamber 14 can flow toward the first layer 71. The mesh of silver nanowires 73 can reflect a portion of the heat, shown by arrow 101, back into the cooking chamber 14. Remaining heat can flow toward the second layer 71. The silver nanowires 73 within the second layer 72 can reflect a portion of the incoming heat, shown by arrow 102, back toward the cooking chamber 14. In addition, the air-filled pores 78 formed within the porous alumina 74 can block another portion of the incoming heat, shown by arrow 103, from transferring through the second layer 72. A very small fraction of heat, shown by arrow 104, can transfer through the second layer 72. In this manner, the insulation film 76 can both reflect or "reject" heat from entering a layer 71, 72, as well as insulate or "block" heat from transferring through a layer 71, 72.

Figure 4:
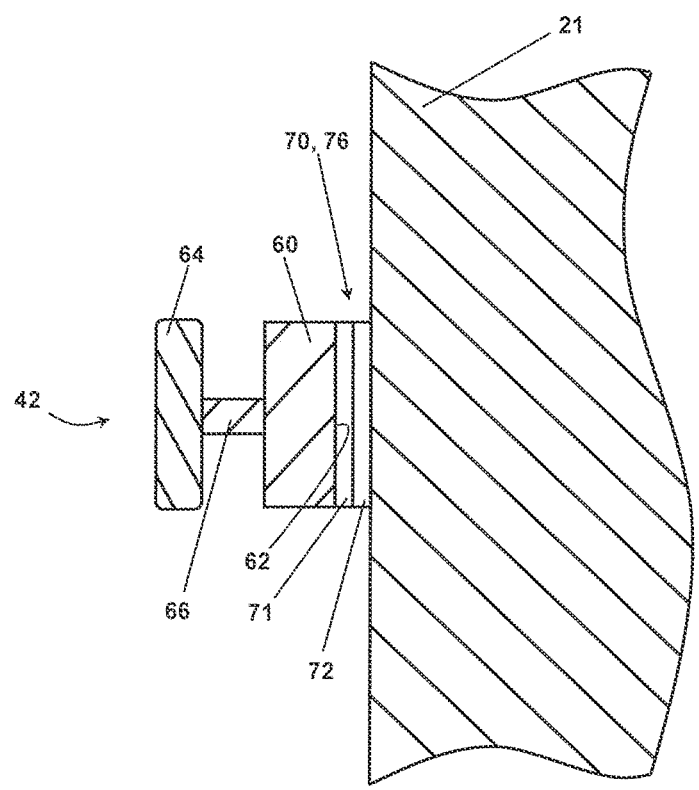
FIG. 4 is a schematic side view of another component for the household cooking appliance of FIG. 1 in the form of a knob that can include the insulation film of FIG. 3.

Referring now to FIG. 4, another component that can be utilized in the cooking appliance 10 is shown in the form of the knob 42 projecting from the front wall 21. The knob 42 can include a knob body 60 with an inner surface 62 thermally confronting the chamber 14 (FIG. 2), as well as a rotatable portion 64 connected to the inner surface 62 by a shaft 66. A user can grasp the rotatable portion 64 to operate the knob 42, such as to adjust a temperature setting of the cooking chamber 14.

Insulation film 76 can also be disposed on the inner surface 62 of the knob 42, such as to prevent excessive heating of the knob 42 during operation of the cooking appliance 10. In one example, the insulation film 76 can be applied to the knob 42 after manufacture of the knob 42, such as by an adhesive or other coupling mechanism. In another example, the knob 42 can be formed integrally with the insulation film 76, such as by placing insulation film 76 into an injection mold prior to forming the knob 42. In such a case, the inner surface 62 of the knob 42 can be injection molded with the insulation film 76 already in place. In the illustrated example, the insulation film 76 is positioned between the inner surface 62 and the front wall 21, with the first layer 71 proximate the inner surface 62 and the second layer 72 proximate the first layer 71.

Figure 5:
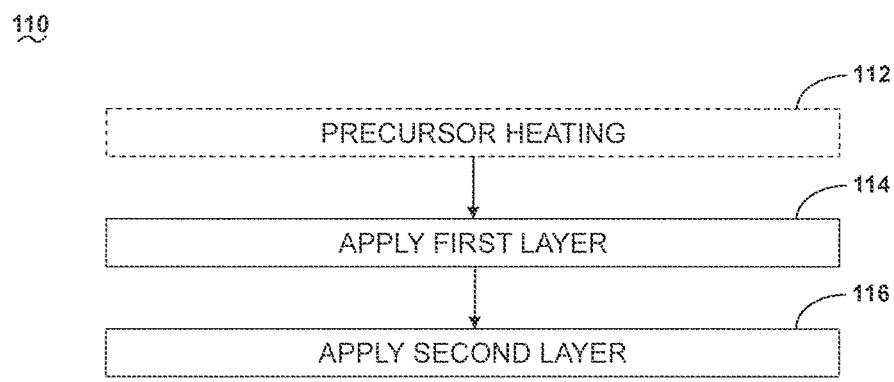
FIG. 5 is a flowchart illustrating a method of forming the insulation film of FIG. 3.

Turning to FIG. 5, one exemplary method 110 is described for forming silver nanowires 73 that can be utilized in the insulation film 76. It will be understood that the method described below provides one example of forming the silver nanowires 73. The method 110 can include other aspects not explicitly described, and that aspects of the method 110 can be performed in any suitable order.

The method 110 can optionally include precursor heating at 112 which can be utilized to grow silver nanowires 73. For example, a solution containing silver nitrate can be heated to a suitable reaction temperature. In one example, silver nanowires with a diameter of 17±2 nm can be obtained at an injection rate of 2.5 mL/s and a reaction temperature of 100° C. The silver nanowires can have uniform diameters, and lengths varying from approximately 10 microns to approximately 40 microns. Optionally, the silver nanowires can be dispersed into a solvent such as ethanol or ethylene glycol in non-limiting examples. Other surfactants can also be added such as two-system-based pre-polymerized polymer (1:10 ratio). In one example, pre-polymerized liquid silicon can be utilized. One benefit of using such a liquid silicon is that it can cure rapidly at elevated temperatures. In one example, a 2.5 mm cross-section can cure within approximately 10-15 seconds at 200° C. In this manner, a blending matrix can be developed utilizing a pre-polymerized polymer as a blending agent with silver nanowires 73. Unique about this technique is its dispersion performance which is prepared as secondary dispersions or by polyaddition of pre-polymers in aqueous systems. The dispersion process can also be adjusted or tailored based on, in non-limiting examples, solubility or insolubility of monomer and initiator, respectively, the presence or absence of surfactant, droplet sizes, particle sizes, or particle formation mechanisms.

In one non-limiting example of reaction conditions utilizing ethylene, an ethylene pressure of 10 to 40 atm and temperature of 30° C. to 75° C. can be utilized, wherein the ethylene does not form a separate liquid phase under these conditions. The particle sizes (average) of the dispersions obtained can be in the range from 100 to 200 nm. In one example, during formation of a polymer dispersion a sufficiently large number of primary particles were nucleated such that the final particles was sufficiently small to be colloidally stable. A matrix comprises of porous alumina silicate blended with 2-system based pre-polymerized polymer can be prepared separately. It can be appreciated that liquid polymer can be utilized to avoid the overheating of the polymer particle when blended in pelletized form. The use of liquid polymer can also help to reduce particle overheating and agglomeration as well as control particle morphology.

Exemplary polymers that can be utilized include, in non-limiting examples, polymers and copolymers of acrylic and methacrylic acids and esters, acrylonitrile, and acrylamide. Due to their large polymerization shrinkage, it can be advantageous to carry out their polymerization in stages to control the product dimensions for use in large-surface-area nanomaterials such as silver nanowires. For this, a two-system-based pre-polymerized polymer can be used to prepare a mixture of polymer. Such a pre-polymerized polymer can provide for ease of handling and minimizes abrupt polymerization shrinkage by the use of pre-polymerized powder. The pre-polymerized powder provides for several benefits including no post-curing, excellent electrical insulating properties, easily pigmented, superior unprimed adhesion to glass fabric and extremely suitable for spray-on and dip coating applications.

The pre-polymerized polymer can be mixed in two parts A and B in a 10:1 ratio. Meter mix equipment can be utilized to pump and mix the two components without excessive incorporation of air into the mixture. In order to avoid air bubble entrapment during their mixing process, the mixture can be thoroughly de-gassed under vacuum to avoid the build-up of voids which may eventually effect the overall thermal performance of the insulation film, especially when used as a blending agent.

At 114, the first layer 71 of silver nanowires can be applied to the substrate 75. The silver nanowires 73 can be applied by spray deposition, including a spray-on coating technique wherein the silver nanowires 73 are dispersed within pre-polymerized polymer as described above. Optionally, the first layer 71 can be pressed onto the substrate, such as via rollers or other mechanisms.

At 116, the second layer 72 of porous alumina 74 can be applied to the first layer 712. Optionally, the second layer 72 can be pressed onto the first layer 71. The porous alumina 74 can, in one example, include porous alumina silicate formed from kaolinite and bentonite clay powders (natural colloidal, hydrated aluminum silicates) mixed together along with active additives which can be based on magnesium nitrate or aluminum nitrate. The porous alumina silicate can be sintered at very high temperatures (e.g. 1800° C.) to develop a porous ceramic structure with selective microcrystalline and amorphous grain boundaries having energy-efficient thermal insulation properties. The desired fine pores (voids) can be formed by sintering raw ceramic powders at a nondensifying temperature. A high porosity level can be achieved via the addition of large quantities of pore formers such as resin beads and carbon, which can be removed latter through oxidation process.

In one example, the porous alumina ceramic can include silica particles with diameters of about 10 nm to about 15 nm developed by a slip casting technique, wherein an aqueous alumina slurry is used with a control loading concentration of metallic aluminum powder. Porosity of the used base material can aid in chemical reaction of aluminum with water by hydrogen gas evolution reaction and solidification of suspension at a temperature of 1650-1750° C. The pore size distribution and mechanical strength the porous alumina 74 can depend on the grain size of the starting materials.

It can be appreciated that the insulation film 76 can be utilized in a variety of contexts where thermal insulation properties may be desired, including cooking appliance components such as front panels, doors, door handles including pocket-style handles, knobs, other fascia components, and other related applications.

Aspects of the disclosure provide for several benefits, including that the use of silver nanowires to form a conductive porous network provides for increased reflection of heat, which can reduce the amount of heat able to transfer to the outer surface. For example, during operation of the oven, heat from within the cooking chamber can transfer to outer components of the oven such as a handle or other human-machine interface components such as knobs, switches, touch panels, or the like. It can be appreciated that the insulation film described herein can reduce an amount of heat transfer to components that a user may touch, improving operability of such user interface components.

In addition, improved chemical stability of silver nanowires make these a suitable material for use as an active ingredient for the proposed heat rejection technology. Silver nanowire meshes can provide for highly effective trapping of thermal radiation, including a high reflectance of thermal radiation from a wide range of incidence angles, such as from approximately 0° (normal/perpendicular incidence) to approximately 85° in a non-limiting example. The insulating film described herein can have significantly improved thermal insulation performance compared to traditional heat reduction components, including a thermal conductivity of approximately 2 W/m-K and a coefficient of thermal expansion of approximately 3.6 μm/m-° C. for temperatures ranging from approximately 25° C. through 1000° C.

Another benefit is that the overall emissivity of the layer having a mesh of silver nanowires is comparable to that of porous alumina (approximately 0.80), which is much greater than the emissivity of bulk silver (approximately 0.02) which provides for excellent insulation against radiative heat loss from the chamber.

In addition, as silver forms only a small fraction of the overall mass of its layer, the insulation film described above provides for a cost-effective solution with excellent insulating properties. Spray-coating a silver nanowire solution can adds a nominal area density of approximately 0.15 g/m². Aspects of the silver nanowires and layered structures described herein can reflect heat, e.g. infrared radiation, by more than 90% back toward the original heat source and the reported increase in its heat reflectance is due to differences in the materials' emissivity. Low-emissivity materials like silver, which has an emissivity of 0.02, emit less radiation and can provide much better insulation than other high-emissivity materials. Silver nanowires with lengths and spacing distances as described herein can improve film packing and stacking options for forming the insulated film. In addition, the proposed spray coating deposition process provides for a low-cost technique that reduces manufacturing time as well as provides for repeatable populating of silver nanowires within the layers as described.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An insulation film for a cooking appliance, comprising:
   a substrate;
   a first layer comprising silver nanowires proximate to the substrate; and
   a second layer comprising porous alumina proximate to the first layer and distal from the substrate, with the porous alumina having an average pore size of 10-35 micrometers.
2. The insulation film of claim 1, wherein the silver nanowires have a diameter of 10-20 micrometers.
3. The insulation film of claim 2, wherein the silver nanowires have a spacing of 150-200 nanometers.
4. The insulation film of claim 3, wherein the silver nanowires have an area density of 0.15-0.25 g/m².
5. The insulation film of claim 1, wherein the first layer comprises a first layer thickness of 50-100 micrometers.
6. The insulation film of claim 5, wherein the second layer comprises a second layer thickness of 50-100 micrometers.
7. The insulation film of claim 6, further comprising an overall thickness defined by the first layer thickness, the second layer thickness, and a substrate thickness of the substrate, wherein the overall thickness is between 200-250 micrometers.
8. The insulation film of claim 1, wherein the substrate comprises an adhesive.
9. The insulation film of claim 1, wherein the first layer further comprises a polymeric material with the silver nanowires dispersed within the polymeric material.
10. The insulation film of claim 1, wherein the silver nanowires form at least one of a structured mesh or an unstructured mesh.
11. The insulation film of claim 2, further comprising additional silver nanowires dispersed within the second layer.
12. The insulation film of claim 11, wherein the additional silver nanowires have a diameter of 10-20 nanometers.
13. The insulation film of claim 12, wherein the additional silver nanowires have a length of 10-80 micrometers.
14. The insulation film of claim 13, wherein the additional silver nanowires have an average spacing of 150-200 nanometers.
15. The insulation film of claim 1, wherein the first layer further comprises porous alumina silicate.
16. A thermal insulation film, comprising:
   a first layer comprising a mesh of silver nanowires with a diameter of 10-20 micrometers and an area density of 0.15-0.25 g/m²; and
   a second layer abutting the first layer and comprising porous alumina with an average pore size of 10-35 micrometers;
   wherein an emissivity of the first layer is between 0.02-0.8.
17. The thermal insulation film of claim 16, further comprising an adhesive substrate coupled to the first layer.
18. The thermal insulation film of claim 16, further comprising additional silver nanowires dispersed within the second layer.
19. The thermal insulation film of claim 18, wherein the additional silver nanowires have at least one of a diameter of 10-20 nanometers, a length of 10-80 micrometers, or an average spacing of 150-200 nanometers.
20. The thermal insulation film of claim 16, wherein the first layer comprises a first layer thickness between 50-100 micrometers, and wherein the second layer comprises a second layer thickness between 50-100 micrometers.

* * * * *